US008316041B1

(12) United States Patent
Chang et al.

(10) Patent No.: US 8,316,041 B1
(45) Date of Patent: Nov. 20, 2012

(54) GENERATION AND PROCESSING OF NUMERICAL IDENTIFIERS

(75) Inventors: Walter Chang, San Jose, CA (US); Michael J. Welch, Los Angeles, CA (US)

(73) Assignee: Adobe Systems Incorporated, San Jose, CA (US)

( * ) Notice: Subject to any disclaimer, the term of this patent is extended or adjusted under 35 U.S.C. 154(b) by 755 days.

(21) Appl. No.: 11/946,680

(22) Filed: Nov. 28, 2007

(51) Int. Cl.
*G06F 17/30* (2006.01)
(52) U.S. Cl. .............................. 707/763; 707/730; 704/2
(58) Field of Classification Search .................. 715/200; 704/2, 4, 7, 9; 707/600, 602, 692, 698, 737, 707/747, 750, 754, 763, 776, 811, E17.124, 707/E17.125, 999.1, 728, 730
See application file for complete search history.

(56) References Cited

U.S. PATENT DOCUMENTS

| 5,704,060 | A | * | 12/1997 | Del Monte ............................ 1/1 |
| 5,794,177 | A | * | 8/1998 | Carus et al. ....................... 704/9 |
| 5,850,520 | A | | 12/1998 | Griebenow et al. |
| 5,937,392 | A | | 8/1999 | Alberts |
| 5,948,061 | A | | 9/1999 | Merriman et al. |
| 6,009,410 | A | | 12/1999 | LeMole et al. |
| 6,014,502 | A | | 1/2000 | Moraes |
| 6,134,532 | A | | 10/2000 | Lazarus et al. |
| 6,154,737 | A | | 11/2000 | Inaba et al. |
| 6,173,045 | B1 | | 1/2001 | Smith |
| 6,243,104 | B1 | | 6/2001 | Murray |
| 6,297,824 | B1 | | 10/2001 | Hearst et al. |
| 6,314,451 | B1 | | 11/2001 | Landsman et al. |
| 7,849,081 | B1 | | 12/2010 | Chang et al. |
| 8,060,506 | B1 | | 11/2011 | Chang et al. |
| 8,090,724 | B1 | | 1/2012 | Welch et al. |
| 2002/0188532 | A1 | | 12/2002 | Rothstein |
| 2004/0181525 | A1 | | 9/2004 | Itzhak et al. |
| 2005/0091106 | A1 | | 4/2005 | Reller et al. |
| 2005/0192792 | A1 | * | 9/2005 | Carus et al. ....................... 704/2 |
| 2005/0229258 | A1 | | 10/2005 | Pigin |
| 2007/0027671 | A1 | * | 2/2007 | Kanawa ............................. 704/4 |
| 2007/0074270 | A1 | | 3/2007 | Meehan et al. |
| 2007/0174267 | A1 | | 7/2007 | Patterson et al. |
| 2007/0198344 | A1 | | 8/2007 | Collison et al. |
| 2008/0086779 | A1 | | 4/2008 | Blake et al. |
| 2008/0147638 | A1 | | 6/2008 | Hoeber et al. |

OTHER PUBLICATIONS

Swaine, Michael "Shhh! Online Libraries", Net Traveler, v 11, n12, p. 155, Dec. 1995.
E-Book Systems, Inc., Flipbrowser—3D page-flipping web brow . . . bmaster, internet, free download trial, www.flipbrowser.com/home.php, p. 1-3, copyright 1998-2001, E-Book Systems, Inc., Santa Clara, CA.
Bell Atlantic Launches Interactive Yellow Pages on Web (Bell Atlantic Interactive launched Yellow Pages directory on World Wide Web; Internet Guide to be in traditional Yellow Pages directories), Newsbytes News Network, p. N/A, p. 1-2, Feb. 12, 1997, Journal (United States).

* cited by examiner

*Primary Examiner* — Greta Robinson
(74) *Attorney, Agent, or Firm* — Kilpatrick Townsend & Stockton LLP

(57) ABSTRACT

A lexical mapper enables efficient text mining via use of lexical identifiers such as numerical identifier values. For example, the lexical mapper receives a collection of text-based strings associated with a document. Based on values of the strings, the lexical mapper maps the text-based strings to a set of lexical identifiers. In lieu of using the character strings, text mining applications process the numerical identifier values to analyze the document.

16 Claims, 9 Drawing Sheets

GENERATION AND PROCESSING OF NUMERICAL IDENTIFIERS

RELATED APPLICATIONS

This application is related to U.S. Pat. No. 8,090,724 entitled "DOCUMENT ANALYSIS AND MULTI-WORD TERM DETECTOR," filed on Nov. 28, 2007, the entire teachings of which are incorporated herein by this reference.

This application is related to U.S. Pat. No. 7,849,081 entitled "DOCUMENT ANALYZER AND METADATA GENERATION AND USE," filed on Nov. 28, 2007, the entire teachings of which are incorporated herein by this reference.

BACKGROUND

Conventional computer systems enable production and distribution of multimedia data, including video, audio and image data. Such production is increasing at a phenomenal rate due to the growing popularity of the Internet, the growing affordability of personal computers capable of efficiently processing multimedia data to provide a pleasing experience for users, and the enhanced viewing experience that multimedia provides over "text-only" type images.

People now access and use multimedia data in numerous ways. One way that people access multimedia data is over a network such as the Internet. For example, people using web browsers on personal computers now routinely access multimedia data by surfing the World Wide Web via the Internet.

Countless numbers of content providers link multimedia data to web pages accessible by people using web browsers. Accordingly, via use of today's web pages, persons using media player applications (e.g., web browsers) can access a web server operated by a content provider to playback content such as view video clips, listen to audio clips, or view images made available by the content provider.

To request media content such as digital video, audio, or some other sampled content from a server, a corresponding client typically provides the global address of the content in the form of a Uniform Resource Locator (URL). After receiving a request for content, a respective server receiving the request then accesses the content and sends or "streams" it to the client as a continuous data stream that is played back by the client as the stream is received. Alternatively, the client can play the content for viewing by the user (e.g., via a media player application) upon completion of receiving all of the content data from the server.

In addition to large amounts of audio, video, and image data, content providers distribute large amounts of data over internal and/or external networks. Often the data is text providing information about transactions, people, companies, etc. In order to derive high quality information from the text, Conventional text mining techniques are applied to the text. Producing "high quality" information in conventional text mining usually involves some combination of determining the relevance, novelty, and interestingness of parts of text. When processing large amounts of text, "high quality" information is typically derived via utilizing various models of statistical pattern learning. More specifically, conventional text mining on large amounts of text usually involves the process of structuring the input text (such as parsing), detecting patterns within the structured data, and evaluating and interpreting the output. Other typical text mining tasks include text categorization, text clustering, concept/entity extraction, sentiment analysis, document summarization, and entity relation modeling (i.e., learning relations between named entities).

SUMMARY

Conventional text mining applications are typically employed to analyze sets of terms (e.g., words in a document, database, etc.) to identify a presence or non-presence of terms.

As an example, large enterprises and organizations, such as life insurance companies, the National Security Agency, etc. typically perform text mining to consolidate, resolve, and analyze data that contains billions of text strings of corresponding to named entities (e.g. names of persons, organizations, locations, expressions of times, quantities, monetary values, percentages, etc.) from across several structured, semi-structured, and unstructured text databases. One purpose for text mining is fraud detection. Another purpose of text mining is to identify relationships amongst named entities.

To be useful, text mining applications must efficiently and accurately reconcile each distinct named entity (person, place, thing, etc.) to a common object.

Often, conventional information retrieval and text mining systems use a set of best-practice natural language processing techniques to identify and extract terms from documents. A deficiency in conventional text mining systems is their reliance on a central controlled vocabulary (or Authority File). The central controlled vocabulary is implemented as a registry to identify names of interest and all related synonym forms.

Techniques discussed herein significantly overcome the deficiencies of conventional applications such as those discussed above. As will be discussed further, certain specific embodiments herein are directed to a lexical mapper. As described herein, a lexical mapper analyzes collections of data (e.g. text, character strings, tokens, words, phrases, etc.) by mapping text-based strings in the collection of data into numerical identifier values such as compressed numerical representations. In one embodiment, the mapping can be achieved without relying on use of a central controlled vocabulary.

More specifically, the lexical mapper can use a lexical map to assign lexical identifiers to text-based strings in each of a plurality of documents. In one embodiment, the lexical identifiers are unique numerical values that can be used to represent the stems of the text-based strings as they occur in the documents.

For example, if a lexical identifier is assigned to numerically represent the stem of "relat", then the lexical identifier (e.g., a unique numerical identifier value in the lexical map) for "relat" can be used to numerically represent different text-based strings such as "relate", "relational", etc.

If the lexical mapper determines that a complex string of text in the document cannot be wholly represented by a single lexical identifier in the lexical map, lexical identifiers in the lexical map can be concatenated with each other to build a new lexical identifier for representing any text-based string.

After the lexical mapper creates a set of lexical identifiers that numerically represents every occurrence of each unique text-based string in the document (or documents), the lexical mapper can apply different functions such as sort, group, count, etc. to lexical identifiers for a document in order to analyze contents of the document.

For example, term frequency metrics for the "relat" lexical identifier can be computed by counting the number of times the lexical identifier for "relat" occurs in the set of lexical identifiers. Processing of the "relat" lexical identifier (e.g., a unique numerical identifier value), instead of counting each occurrence of every text-based string or phrase that includes the stem "relat", enables a text mining application to produce results more quickly. Additionally, each lexical identifier can be a smaller, compressed representation as compared to a corresponding text-based string. Accordingly, use of the lexical mapper and corresponding lexical identifier values according to embodiments herein can reduce an amount of storage needed to store terms found in documents as well as reduce processing costs needed to analyze the documents.

As a more specific example of embodiments herein, a lexical mapper function receives a collection of text-based strings associated with a document. The lexical mapper function maps the text-based strings in the collection of text-based strings to a set of lexical identifiers. As discussed above, such mapping allows for each lexical identifier in the set of lexical identifiers to be a unique numerical value that represents a corresponding text-based string in the collection of text-based strings. An analyzer can be configured to analyze the text-based strings (e.g., terms or phrases) in the collection based on processing of the set of lexical identifiers associated with the text-based strings.

Processing of the lexical identifiers can be used by text mining applications to identify occurrence of terms. In other embodiments, processing of the lexical identifiers can be used for targeted online advertising. For example, the lexical mapper can detect that a user is accessing a web document, which includes a plurality of text-based strings. A lexical map (which provides lexical identifiers for terms that occur in the web document) can be utilized to perform a mapping function on the plurality of text-based strings from the web document to create a set of lexical identifiers. The set of lexical identifiers includes lexical identifiers from the lexical map that numerically represent the plurality of text-based strings in the web document.

As the user consumes a portion of the web document, the lexical mapper can identify a corresponding lexical identifier in the set of lexical identifiers that represents a text-based string occurring in the consumed portion (e.g., viewed portion) of the web document. By processing the corresponding lexical identifier, the lexical mapper can create a term frequency metric. The term frequency metric can thereby be used to determine targeted advertising for the user that relates to the portion of the document being consumed.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

As discussed above, techniques herein are well suited for use in applications associated with text mining operations. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a lexical mapper, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Embodiments herein include a lexical mapper function that allows for efficient text mining via lexical identifiers that are compressed representations of text-based strings. Via use of the lexical identifiers, less storage and processing costs are incurred in comparison to conventional text mining systems. The lexical mapper function can be configured to produce a lexical identifier for any text string, without having to access a central controlled vocabulary.

According to one embodiment, a lexical mapper receives a collection of text-based strings associated with a document. The lexical mapper maps the text-based strings in the collection of text-based strings to a set of lexical identifiers. Such mapping allows for each lexical identifier in the set of lexical identifiers to be a unique numerical value that represents a corresponding text-based string in the collection of text-based strings. A document processing function can be configured to analyze the text-based strings in the collection based on processing of the set of lexical identifiers associated with the text-based strings.

If an exact match for a text-based string cannot be found in the lexical identifier map, then the lexical mapper breaks down the text-based string into multiple components and then matches the multiple components to lexical identifier values in the map. These and other embodiments will be discussed in more detail below.

Figure 1:
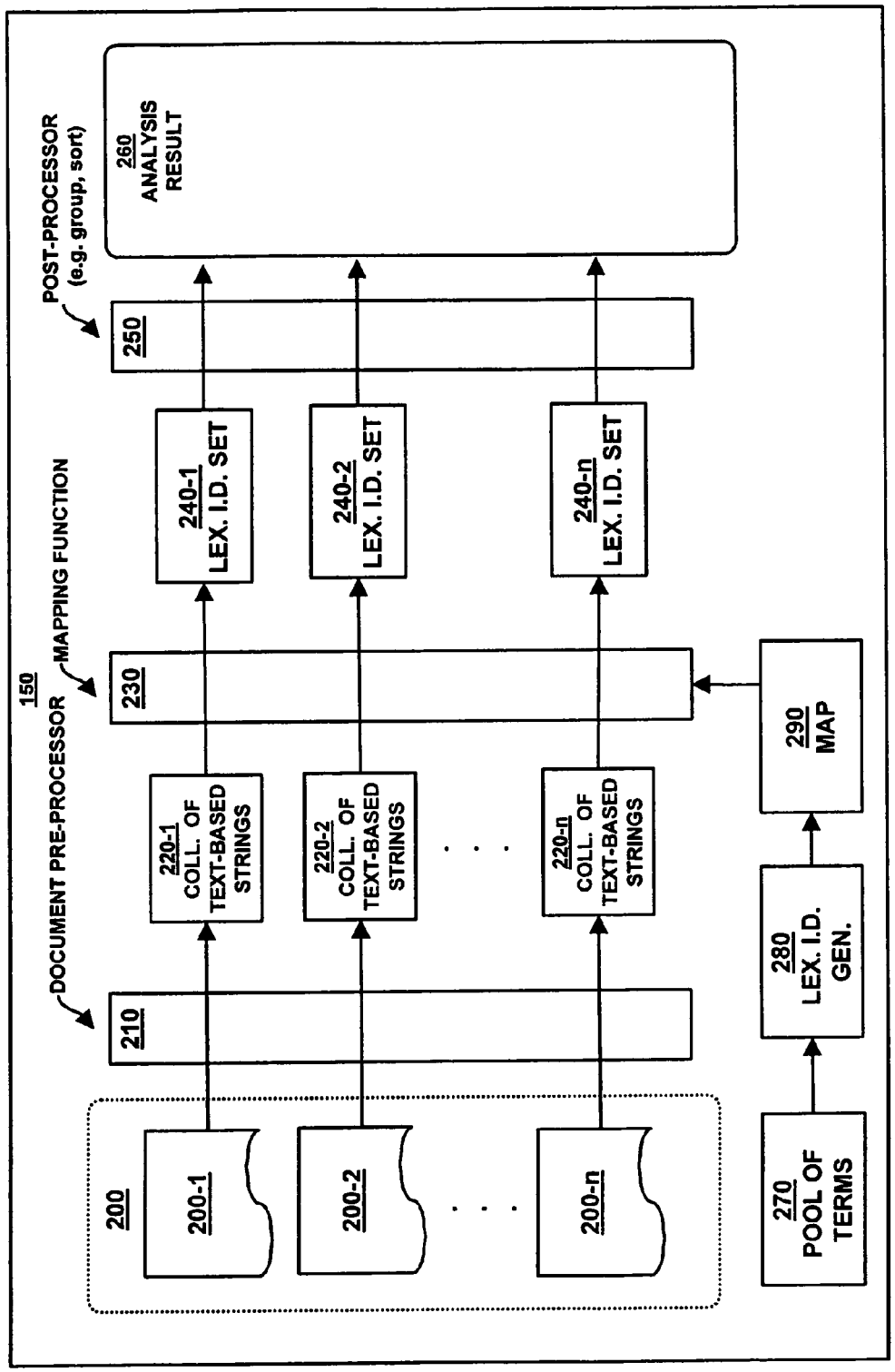
FIG. 1 is an example block diagram of a computer system configured with a lexical mapper and related functions according to embodiments herein.

FIG. 1 is a block diagram illustrating a document processing environment 150 according to embodiments herein. The document processing environment 150 includes a pool of documents 200, which includes documents 200-1, 200-2, 200-n.

Each document 200-1, 200-2, . . . , 200-n can include text-based strings (e.g., words, phrases, terms, etc.). The document pre-processor 210 of document processing environment 150 processes each document 200-1, 200-2, . . . , 200-n in order to filter the text-based strings of each document 200-1, 200-2, . . . , 200-n. For example, the document pre-processor 210 can filter each document 200-1, 200-2, 200-n to retain text-based strings that are the most useful to the lexical mapper 150. It is understood that embodiments herein can be generalized for use with text-based strings of any language or system in which symbols are used to represent something.

As a more specific example, the document pre-processor 210 can (1) filter out any punctuation from the documents 200-1, 200-2, 200-n, (2) remove stopwords (e.g. "and", "the", "a") from the documents 200-1, 200-2, 200-n, and/or (3) perform a codepoint normalization algorithm to normalize the text-based strings in the documents 200-1, 200-2, 200-n according to a predefined language.

In addition, the document pre-processor 210 can apply a stemming algorithm (e.g. Porter Stemming) to convert each text-based strings from the documents 200-1, 200-2, 200-n into their respective stems (e.g., roots).

As a result of pre-processing, the document pre-processor 210 creates collections of text-based strings 220-1, 220-2, . . . , 220-n where each collection of text-based strings 220-1, 220-2, . . . , 220-n is a filtered version of a respective document 200-1, 200-2, . . . , 200-n.

More specifically, collection of text-based string 220-1 includes stemmed terms found in document 200-1, collection of text-based string 220-2 includes stemmed terms found in document 200-2, and so on.

Mapping function 230 in document processing environment 150 converts the text-based strings in a corresponding collection to a corresponding lexical identifier as indicated by map 290.

Map 290 can be generated based on processing of a pool of terms 270 (e.g., a selected group of words, phrases, etc.). For example, to create the lexical map 290, the lexical id generator 280 creates a lexical identifier for each of multiple terms found in pool of terms 270.

In one embodiment, the pool of terms is a set of terms that are most likely to be present in the documents 200. Thus, during a mapping process as discussed below, the mapping function 230 is more likely able to match terms in the documents 200 to unique values.

For each term in the pool of terms 270, the lexical identifier generator 280 generates a corresponding lexical identifier value for storage in map 290. In one embodiment, each lexical identifier value is a unique numerical value (e.g. binary, hexadecimal) chosen from a set of values, such as 00 hex, 01 hex, 02 hex, . . . FF hex, to represent a term (e.g. words, phrases, character strings) in the pool of terms 270.

It should be understood that the actual values of the lexical identifiers can be randomly generated and arbitrarily assigned to a corresponding term in pool of terms 270.

In an example embodiment, the lexical identifier generator 280 associates each of the terms in pool of terms 270 to a unique 2-byte value. Use of a two-byte (e.g., 16-bit) unique identifier value enables the map 290 to include up to 65,536 mappings of corresponding terms to unique numerical identifier values.

Note that use of a two-byte value as size of the lexical identifier value is by way of example only and that a size of the numerical identifier value (e.g., lexical identifier value) for each term can vary depending on the application. Use of a 2-byte lexical identifier value is useful because it enables a numerical representation of many words in pool of terms 270, yet the 2-byte value is small in size to reduce storage needs. In addition, use of 2-byte values reduces the resulting size of the map 290. This allows for the map 290 to be distributed and used at any remote location to perform functions such as text mining, without the document processor having to refer back to a central vocabulary as is needed in conventional systems.

Although lexical identifier values have been described as being 2 byte values, it should be understood that the embodiments herein discussed can be implemented with lexical identifier values and lexical identifiers of any size or length. Note that depending on the embodiment, the lexical map 290 can be, for example, a tree, a hash table, hash function, etc. that stores each term from the pool of terms 270 in an association with a corresponding lexical identifier value. Also, note that map 290 be configured in any way as to provide the mapping between the terms in pool of terms 270 and chosen lexical identifier values.

As previously discussed, the mapping function 230 converts the terms found in each of the collections of text-based strings 220 into corresponding sets of lexical identifiers 240. For example, for each text-based string in the collection of text-based strings 220-1, the mapping function 230 generates a corresponding lexical identifier for inclusion in the lexical identifier set 240-1; for each text-based string in the collection of text-based strings 220-2, the mapping function 230 generates a corresponding lexical identifier for inclusion in the lexical identifier set 240-2; and so on.

Collection of text-based strings 220-1 can include any type of characteristic string including letters, numbers, punctuation, etc. If the entire text-based string retrieved from the collection of text-based strings 220-1 matches an entry in map 290, the mapping function 230 maps the whole string to the corresponding lexical identifier value as specified in the map. If the entire string retrieved from the collection of text-based strings 220 does not match an entry in map 290, the mapping function 230 parses the retrieved text-based string into multiple portions and then maps the portions to corresponding lexical identifier values in map 290. A single lexical identifier can be generated based on the corresponding lexical identifier values. This will be discussed in more detail later in this specification.

After completing a mapping of text-based strings to lexical identifiers, a corresponding lexical identifier set 240 represents the contents of a corresponding document in terms of unique numerical identifier values (e.g., lexical identifiers).

The post-processor 250 of the document processing environment 150 can apply post-processing algorithms (e.g., text mining algorithms) to lexical identifier sets 240-1, 240-2, . . . , 240-n, in order to analyze and identify contents of documents 200. Thus, embodiments herein include processing of the lexical identifier values, rather than the original text-based strings found in the documents 200, to identify occurrence of terms in the documents. For example, the post-processor 250 can sort, group, count, etc. occurrences of the lexical identifiers in the lexical identifier sets 240 to produce analysis results 260 such as term frequency metrics, identification of terms in the documents, etc.

In general, the term frequency metric for a given document 200-1, 200-2, 200-n is a metric related to the number of times a given term appears in that document. In certain cases, a corresponding term can be representative of an essence of a document. A term frequency count indicating a number of occurrences of the term in the document can thus provide a valuable measure as to the importance of the given term with respect to the document.

Term frequency can be normalized to account for different length documents.

Figure 2:
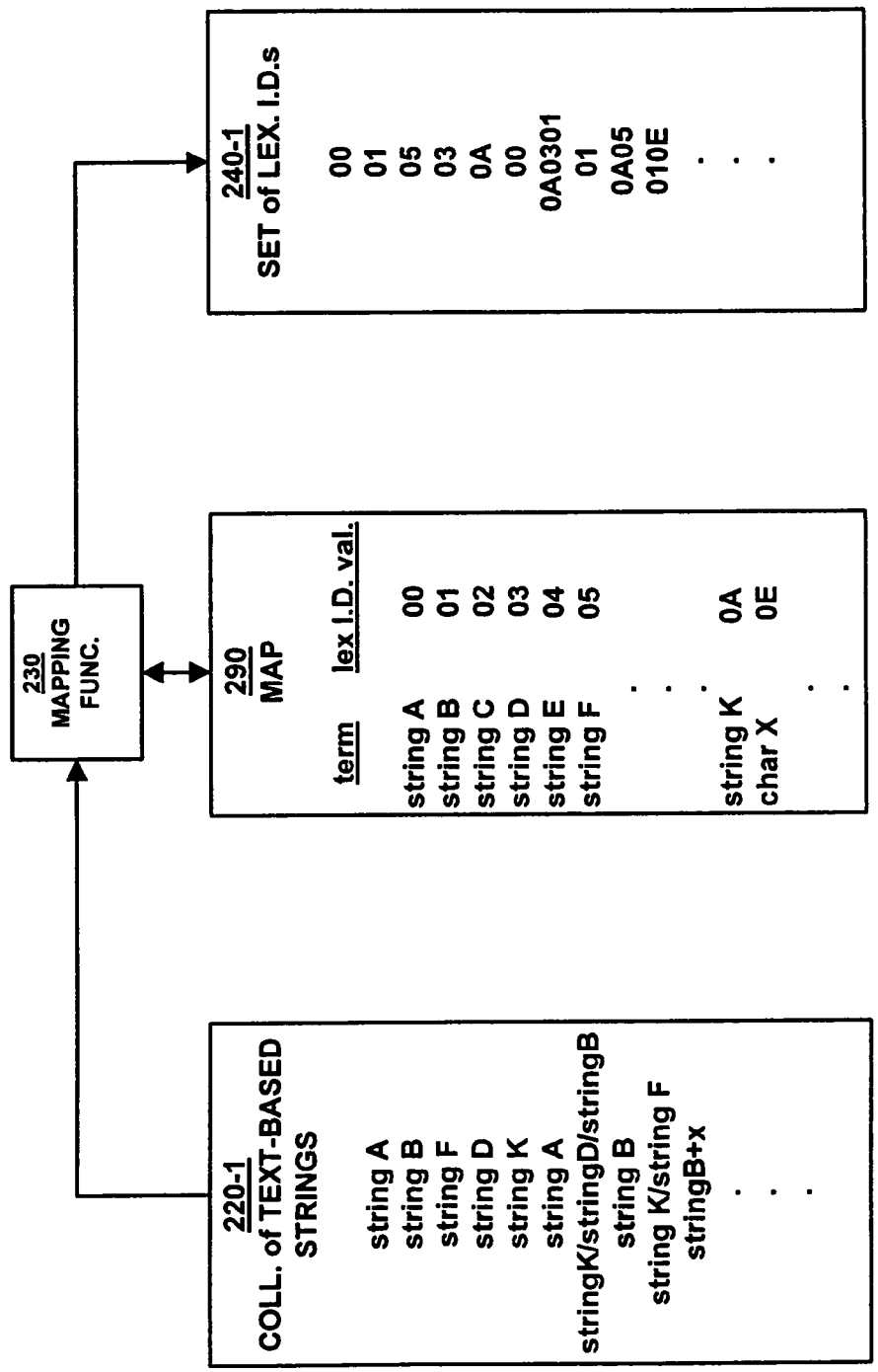
FIG. 2 is an example block diagram illustrating a lexical mapper function performing mapping of a collection of text-based strings to lexical identifiers according to embodiments herein.

FIG. 2 is an example block diagram of a document processing environment including a lexical mapping function 230 according to embodiments herein. As illustrated, the collection of text-based strings 220-1 can include any number of text-based strings. Assume in this example that string A represents a first word, string B represents a second word, string F represents a third word, and so on.

Note that each text-based string can include multiple words.

As previously discussed, the lexical map 290 provides a mapping between character strings (e.g., terms) and lexical identifier values. In one embodiment, the map 290 includes an entry for each character in the alphabet (e.g., A, B, C, D, E, . . . Z) as well as numbers 0, 1, 2, 3, 4, 5, 6, 7, 8, and 9. Thus, any letters and numbers found in the collection of text-based strings 220-1 can be converted to a corresponding lexical identifier value.

Note that mapping of the letters may case sensitive. In such an instance, the map 290 can include mappings for each upper case letter and each lower case letter of the alphabet.

As previously discussed, a size of the lexical identifiers stored in map 290 can be, in most cases, smaller in size than the terms that they represent. In the context of the present example, the lexical identifier values are 2-byte values.

The mapping function 230 utilizes the lexical map 290 and the collection 220-1 of text-based strings to create a set of lexical identifiers 240-1. For example, the mapping function 230 first identifies that the collection of text-based strings 220-1 includes string A. Based on map 290, the mapping function 230 identifies that string A maps to the lexical identifier value of 00. Since a complete match is found in the lexical map 290 for string A, the mapping function 230 includes the lexical identifier value 00 in the set of lexical identifiers 240-1.

The mapping function 230 repeats the above process for each of the other text-based strings in the collection of text-based strings 220-1. For example, the mapping function 230 next identifies that the collection of text-based strings 220-1 includes string B. Based on map 290, the mapping function 230 identifies that string B maps to the lexical identifier value of 01. Since a complete match is found in the lexical map 290 for string B, the mapping function 230 includes the lexical identifier value 01 in the set of lexical identifiers 240-1.

Next, the mapping function 230 identifies that the collection of text-based strings 220-1 includes string F. Based on map 290, the mapping function 230 identifies that string F maps to the lexical identifier value of 05. Since a complete match is found in the lexical map 290 for string F, the mapping function 230 includes the lexical identifier value 05 in the set of lexical identifiers 240-1.

Eventually, the mapping function 230 attempts to match "string K/string D/string B" to as a single lexical identifier value in map 290. However, there is no lexical identifier in the lexical map 290 that is a complete match for "string K/string D/string B". In such an instance, mapping function 230 will build a lexical identifier to represent "string K/string D/string B".

To build a lexical identifier, the mapping function 230 matches portions of "string K/string D/string B" with terms in the map 290 to identify multiple lexical identifier value associated with the string. For example, the mapping function 230 maps string K to lexical identifier value 0A, string D to lexical identifier value 03, and string B to lexical identifier value 01. After mapping all portions of the original string (e.g., string K/string D/string B) to corresponding lexical identifier values, the mapping function 230 produces a single lexical identifier value based on the corresponding lexical identifier values. In one embodiment, to build the single lexical identifier, the mapping function 230 concatenates the lexical identifier values (0A, 03, 01). Lexical identifier (0A0301) in set of lexical ids 240-1 represents "string K/string D/string B".

In yet another mapping example for the tenth entry of the collection of text-based strings 220-1, the mapping function 230 identifies "string B+x" as a single text-based string in the collection 220-1, where "string B+x" is "string B" with character "x" (e.g., the letter 'x') appended at the end. However, there is no lexical identifier in the lexical map 290 that is a complete match for "string B+x". Thus, the mapping function 230 builds a lexical identifier to represent "string B+x".

To build a lexical identifier for "stringB+x", the mapping function 230 will match portions of "string B+x" with the lexical identifiers in the lexical map 290. For example, the mapping function 230 maps string B to the lexical identifier value 01 and the letter "x" to the lexical identifier value 0E. In one embodiment, the mapping function 230 concatenates the lexical identifiers (01 and 0E) to build a lexical identifier (010E) that represents "string B+x". After creating the lexical identifier 010E, the mapping function 230 stores it in the set of lexical identifiers 240-1.

Note that since map 290 includes a lexical identifier value for each letter of the alphabet as well as numbers 0-9, the mapping function 230 is able to produce a lexical identifier for any character string without having to consult a mapping source other than map 290. If a character string for a lexical identifier becomes too long based on concatenation of many lexical identifier values, the character string can be reduced in size to a value such as an 8-byte value.

Further, it is understood that the map 290 can be used in reverse to recover the original stemmed text-based string when given its lexical identifier. For conditions where overflow conditions have not occurred, strings in the map 290 can be identified according to the values used to create the given lexical identifier. For example, given the lexical identifier 010E, the mapping function 230 can "reverse map" the lexical identifier value 01 to "string B," lexical identifier 0E to the letter "x", and so on.

Thus, embodiments herein can include reverse mapping of sets of lexical identifiers into corresponding set of text-based strings. For example, a lexical identifier processor can receive a collection of lexical identifier values in which each lexical identifier in the collection is a unique numerical value representing a corresponding text-based string. Based on reverse mapping, the lexical identifier can reproduce the pre-processed (e.g. stopword eliminated, stemmed, etc.) version of an original document of terms by mapping the lexical identifier values in the collection to a set of text-based strings.

Figure 3:
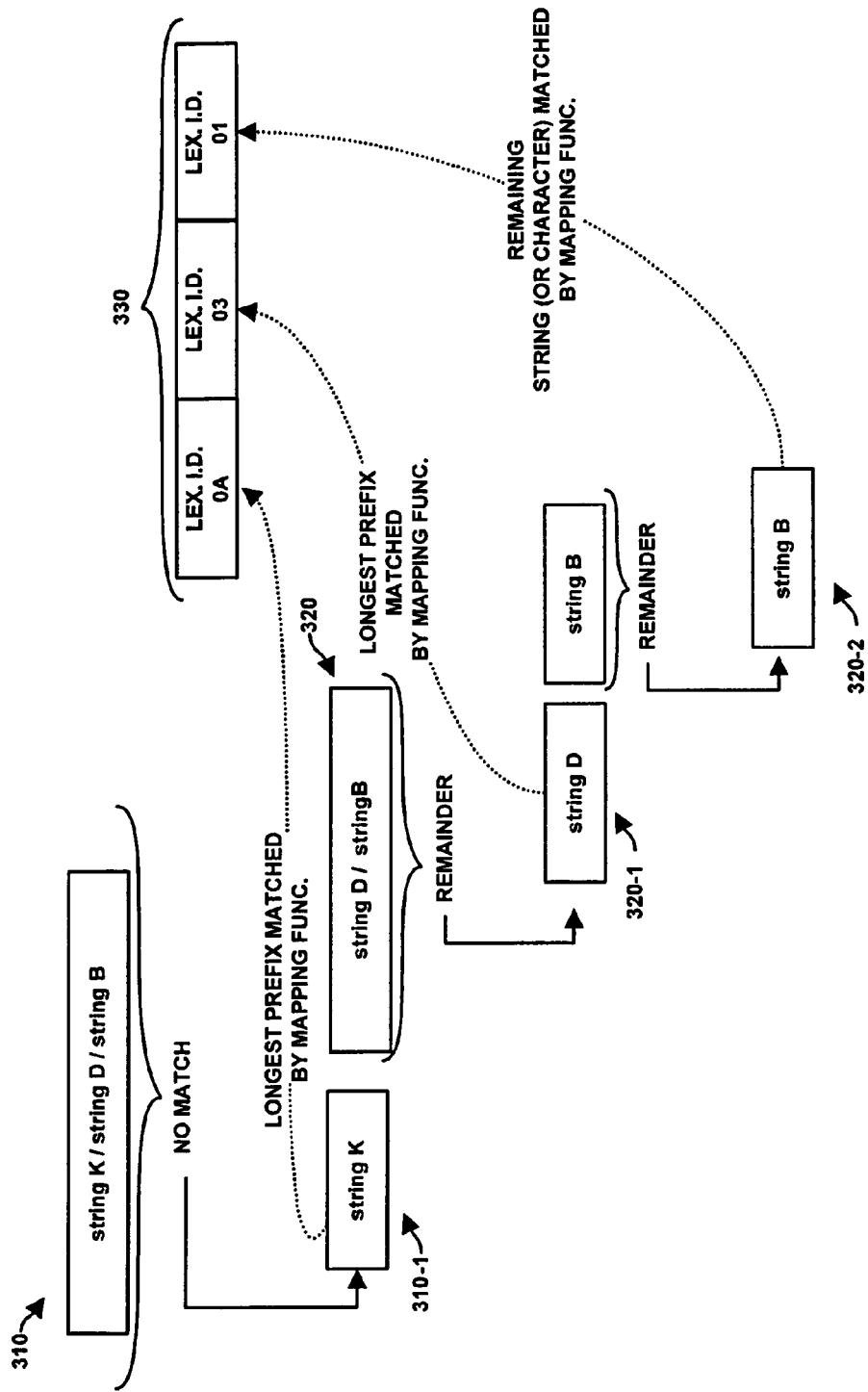
FIG. 3 is an example block diagram illustrating how a lexical mapper function builds a lexical identifier for a complex text-based string according to embodiments herein.

FIG. 3 is an example block diagram illustrating mapping of strings to lexical identifier values according to embodiments herein. FIG. 3 more particularly illustrates how the mapping function 230 utilizes the lexical map 290 during the mapping function 230 to produce a lexical identifier 330.

For example, the mapping function 230 receives a particular complex text-based string 310 of "string K/string D/string B". The mapping function searches lexical map 290 to determine if there is a lexical identifier in the lexical map 290 that has been assigned to represent "string K/string D/string B".

Since there is no matching lexical identifier value in the map 290 that matches the entire complex text-based string 310, the mapping function 230 attempts to find longest matching prefix portions of the complex text-based string 310 that can be individually represented by lexical identifiers in the lexical map 290. For example, the mapping function 230 parses through the complex text-based string 310 to find the largest prefix (e.g. any sequence of characters) in the complex text-based string 310 that has a corresponding lexical identifier in the lexical map 290.

Since "string K" 310-1 is the longest prefix of the text-based string 310 to maps to a lexical identifier value (e.g., lexical identifier value "0A") in the lexical map 290, the mapping function 290 removes the prefix "string K" 310-1 from the complex text-based string 310 and stores the lexical identifier value 0A in register 330.

The mapping function 230 iterates the same parsing and longest prefix matching process as discussed above for the remaining portions 320 of the complex text-based string 310 that have not been matched to a lexical identifier value. Since "string D" 320-1 is the next longest matching prefix in the remainder that maps to a lexical identifier value in the map 290, the mapping function 230 removes string D from the remainder 320-1 to produce remainder 320-2 and stores lexical identifier value 03 in register 330.

Finally, the mapping function 230 attempts to match the remaining portion 320-2 of the complex text-based string 310 (e.g., "string B") to a lexical identifier value. Again, the mapping function 230 iterate the same parsing and prefix matching process to identify that the remainder 320-2 (e.g., string B) maps to lexical identifier value "01".

Hence, although the lexical map 290 does not have a single lexical identifier value that maps to "string K/string D/string B" 310, it creates a lexical identifier 330 for the complex text-based string 310 based on lexical identifier values that are matched to portions 310-1, 320-1, 320-2 of the complex text-based string 310. By concatenating the lexical identifiers (0A, 03, 01) for the portions 310-1, 320-1, 320-2 of the complex text-based string 310, a lexical identifier 330 for "string K/string D/string B" 310 can be produced that numerically represents the complex text-based string 310 as 0A0301.

Note that the technique for identifying the longest matching prefix (i.e. a "greedy" algorithm) can include attempting to match a string under test (e.g., a text-based string from collection of text-based strings) by attempting to first match the whole string to a term in the map 290. If no match is found, the mapping function 230 truncates the string under test by removing the last character and attempts to match the truncated string under test with a lexical identifier value in the map 290. If no match is found, the mapping function 230 truncates the string under test by removing the last two characters and attempts to match the truncated string under test with a lexical identifier value in the map 290. The mapping function 230 repeats this process until it is finds a match for the longest prefix of the remaining portion of the string under test. As discussed above, the mapping function 230 can map on a character by character basis to produce a lexical identifier.

As another example, assume that a term found in document 200-1 is "relational database." Document pre-processor 210 may store the word as the text-based string "relat databas" (e.g., a stemmed version of the original term according to the Porter stemming algorithm) in collection of text-based strings 220-1. In accordance with the above-process, the mapping function 230 may produce a lexical identifier based on a lexical identifier value retrieved from map 290 for each the terms "relat" and "databas" (assuming no single lexical identifier value exists for the whole string "relat database").

In another example, assume that the document includes at least one occurrence of the term "BMW325i" and the collection of text-based strings 220-1 includes such a string as the term has no corresponding root term. To produce a lexical identifier for inclusion in lexical identifier set 240-1, the mapping function 230 attempts to find matching of longest prefixes in the term "BMW325i". Assume that individual portions of the term cannot be mapped to a lexical identifier value.

For example, assume that the mapping function 230 attempts to match "BMW325i" to a lexical identifier value and fails.

Based on the failed mapping, the mapping function 230 then attempts to match "BMW325" to a corresponding lexical identifier value in map 290. Assume that this attempt fails.

The mapping function 230 then attempts to match "BMW32" to a corresponding lexical identifier value in map 290. Assume that this attempt fails.

The mapping function 230 then attempts to match "BMW3" to a corresponding lexical identifier value in map 290. Assume that this attempt fails.

The mapping function 230 then attempts to match "BMW" to a corresponding lexical identifier value in map 290. Assume that this attempt fails.

The mapping function 230 then attempts to match "BM" to a corresponding lexical identifier value in map 290. Assume that this attempt fails.

The mapping function 230 then attempts to match "B" to a corresponding lexical identifier value in map 290 and finds a character match. The mapping function 230 saves the lexical identifier value for the letter "B".

The mapping function then attempts to match the remainder term "MW325i" to a string in map 290. Assume that this attempt fails.

The mapping function 230 then attempts to match "MW325" to a corresponding lexical identifier value in map 290. Assume that this attempt fails.

The mapping function 230 then attempts to match "MW32" to a corresponding lexical identifier value in map 290. Assume that this attempt fails.

The mapping function 230 then attempts to match "MW3" to a corresponding lexical identifier value in map 290. Assume that this attempt fails.

The mapping function 230 then attempts to match "MW" to a corresponding lexical identifier value in map 290. Assume that this attempt fails.

The mapping function 230 then attempts to match "M" to a corresponding lexical identifier value in map 290 and finds a character match. The mapping function 230 saves the lexical identifier value for the value "M". The mapping function then attempts to match the remainder term "W325i" to a string in map 290. Assume that this attempt fails.

The mapping function 230 then attempts to match "W325" to a corresponding lexical identifier value in map 290. Assume that this attempt fails.

The mapping function 230 then attempts to match "W32" to a corresponding lexical identifier value in map 290. Assume that this attempt fails.

The mapping function 230 then attempts to match "W3" to a corresponding lexical identifier value in map 290. Assume that this attempt fails.

The mapping function 230 then attempts to match "W" to a corresponding lexical identifier value in map 290 and finds a character match. The mapping function 230 saves the lexical identifier value for the value "W".

The mapping function then attempts to match the remainder term "325i" to a string in map 290. Assume that this attempt fails.

The mapping function 230 then attempts to match "325" to a corresponding lexical identifier value in map 290. Assume that this attempt fails. The mapping function 230 then attempts to match "32" to a corresponding lexical identifier value in map 290. Assume that this attempt fails.

The mapping function 230 then attempts to match "3" to a corresponding lexical identifier value in map 290 and finds a number match. The mapping function 230 saves the lexical identifier value for the value "3".

The mapping function then attempts to match the remainder term "25i" to a string in map 290. Assume that this attempt fails.

The mapping function 230 then attempts to match "25" to a corresponding lexical identifier value in map 290. Assume that this attempt fails.

The mapping function 230 then attempts to match "2" to a corresponding lexical identifier value in map 290 and finds a number match. The mapping function 230 saves the lexical identifier value for the value "2".

The mapping function then attempts to match the remainder term "5i" to a string in map 290. Assume that this attempt fails.

The mapping function 230 then attempts to match "5" to a corresponding lexical identifier value in map 290 and finds a number match. The mapping function 230 saves the lexical identifier value for the value "5".

The mapping function then attempts to match the remainder term "i" to a string in map 290 and finds a letter match. The mapping function 230 saves the lexical identifier value for the value "i".

The mapping function 230 then uses all seven lexical identifier values to produce a lexical identifier representing the term "BMW325i". This can include a concatenation of all of the saved lexical identifier values. Each lexical identifier can be created so it does not exceed a threshold value in length such as 8 bytes.

As described herein, an algorithm can be applied to the grouping of saved lexical identifier values to produce a lexical identifier to uniquely represent the term "BMW325i". This process is repeatable so that a conversion of every term in the collection of text-based strings 220-1 maps to the same lexical identifier.

Figure 4:
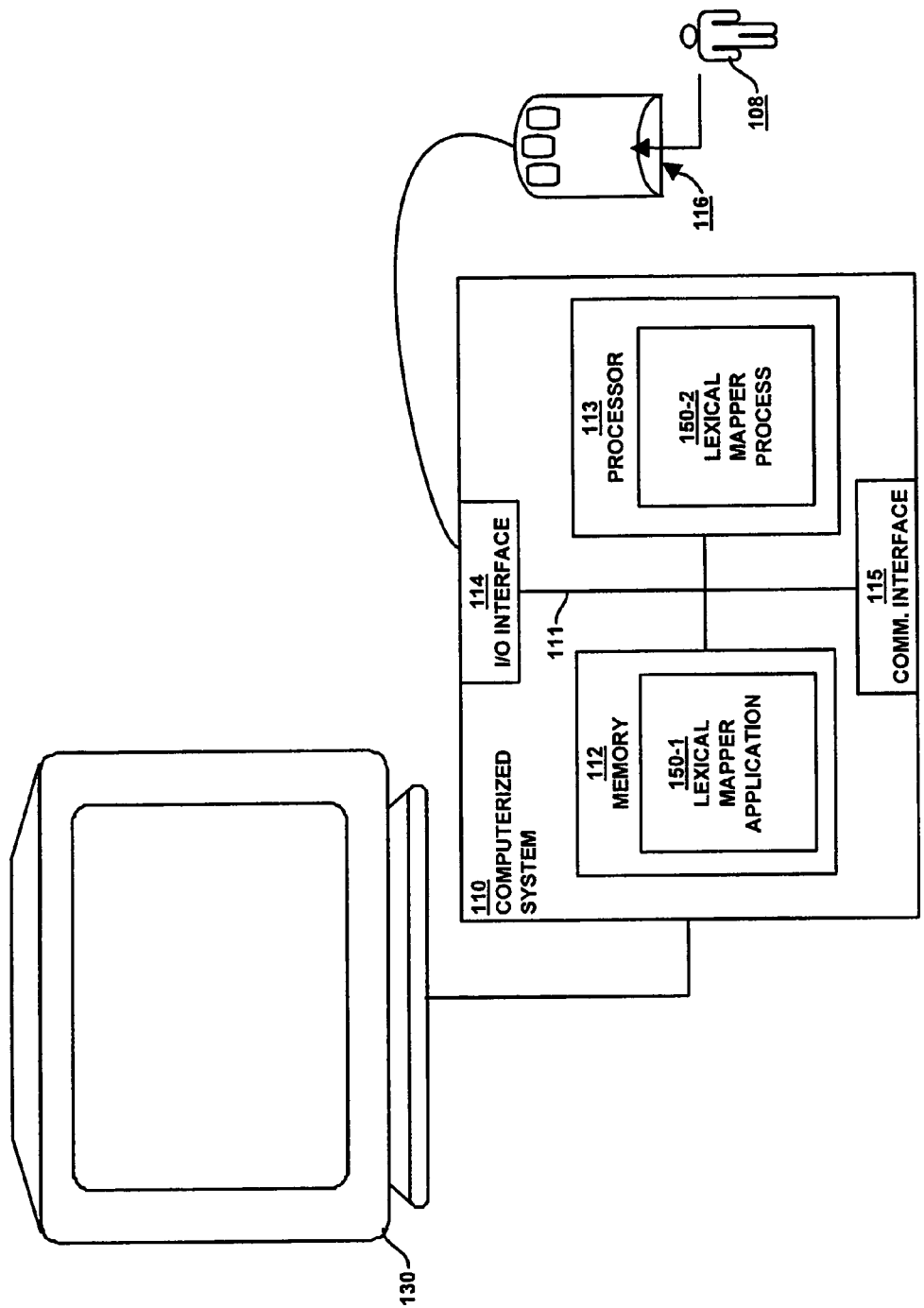
FIG. 4 is an example block diagram of an architecture for a computer system configured to execute a lexical mapper according to embodiments herein.

FIG. 4 is an example block diagram illustrating an architecture of a computer system 110 that executes, runs, interprets, operates or otherwise performs a lexical mapper application 150-1 and/or lexical mapper process 150-2 (e.g. an executing version of a lexical mapper 150 as controlled or configured by user 108) according to embodiments herein. The lexical mapper 150 can be configured to perform any of the operations supported by mapping function 230 or related functions such as document pre-processor 210, post-processor 250, lexical identifier generation 280, etc.

Note that the computer system 110 may be any type of computerized device such as a personal computer, a client computer system, workstation, portable computing device, console, laptop, network terminal, etc. This list is not not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the lexical mapper 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the lexical mapper application 150-1 and/or the lexical mapper process 150-2 can be distributed and executed in multiple nodes in a computer network environment or performed locally on a single computer.

The memory system 112 can be any type of computer readable medium (e.g., tangible computer readable medium) and, in this example, is encoded with a lexical mapper application 150-1 that supports generation of lexical identifiers, generation of map 290, and text mining processes such as those supported by post-processor 250 as discussed herein.

During operation of the computer system 110, the processor 113 accesses the memory system 112 via the interconnect 111 in order to launch, run, execute, interpret or otherwise perform the logic instructions of the lexical mapper application 150-1. Execution of the lexical mapper application 150-1 in this manner produces the lexical mapper process 150-2. In other words, the lexical mapper process 150-2 represents one or more portions or runtime instances of the lexical mapper application 150-1 (or the entire application 150-1) performing or executing within or upon the processor 113 in the computerized device 110 at runtime.

Those skilled in the art will understand that the computer system 110 may include other processes and/or software and hardware components, such as an operating system. Display 130 need not be coupled directly to computer system 110. For example, the lexical mapper application 150-1 can be executed on a remotely accessible computerized device via the communication interface 115. In this instance, the graphical user interface may be displayed locally to a user 108 of the remote computer, and execution of the processing herein may be client-server based.

FIG. 5 through FIG. 9 illustrate various embodiment of the lexical mapper 150. The rectangular elements in flowcharts 500, 600, 700, 800 and 900 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 500, 600, 700, 800 and 900 do not necessarily depict the syntax of any particular programming language. Rather, flowcharts 500, 600, 700, 800 and 900 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 5:
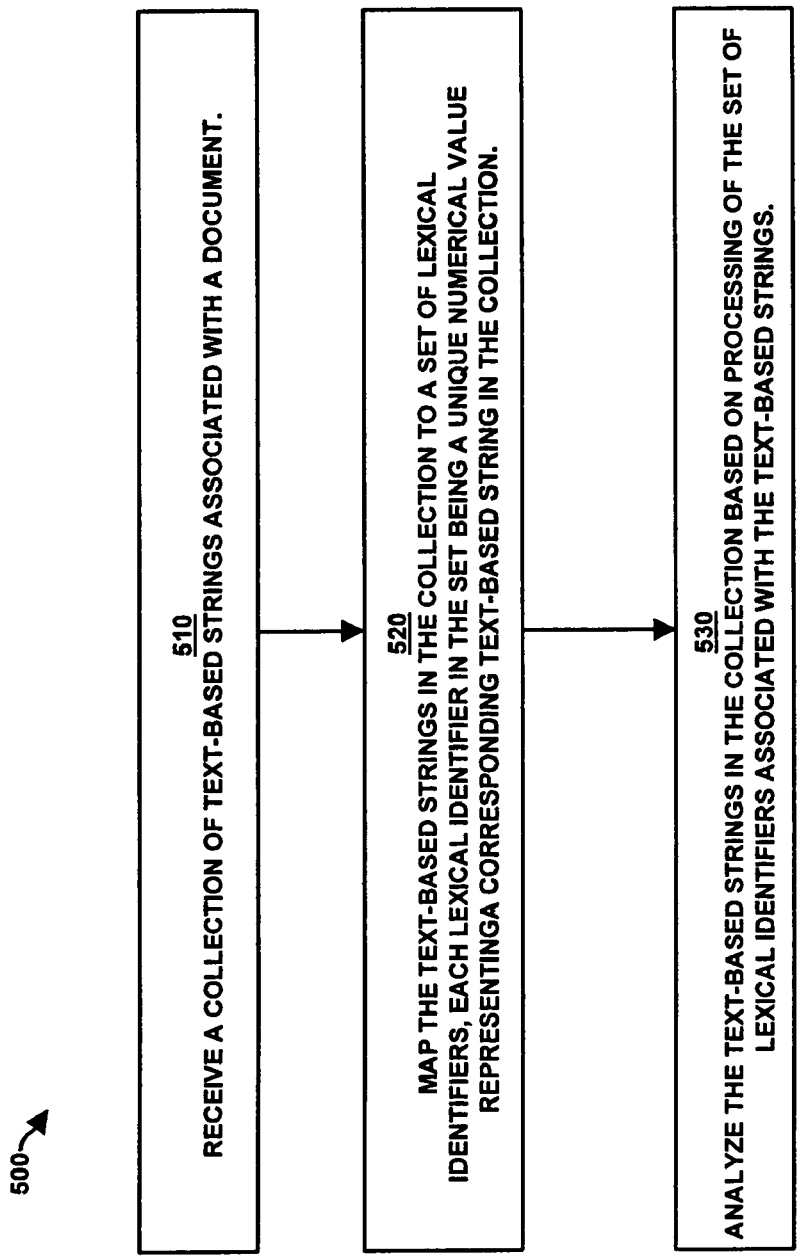
FIG. 5 is an example flowchart of processing steps performed by a lexical mapper function to analyze text-based strings based on processing of lexical identifiers according to embodiments herein.

FIG. 5 is a flowchart of processing steps performed by a lexical mapper 150 (e.g., mapping function 230) to analyze text-based strings based on processing lexical identifiers according to embodiments herein. Note that the ordering of steps of all the flowcharts as described herein is by way of example only. In general, the order of processing steps can be modified.

At step 510, the lexical mapper 150 receives a collection of text-based strings 220-1 associated with a document 200-1. In one embodiment, the lexical mapper 150 (e.g., document pre-processor 210 processes the document(s) 200-1 to produce the collection of text based strings 220-1 by: i) filtering punctuation from the document(s), ii) removing stopwords from the document, and iii) generating stem values from phrases in the document(s). Note that the documents 200 can be any type of resource used to store data. For example, the documents 200 can be text-based documents generated by text editor applications, web pages, e-mails, database records, databases, files, etc.

At step 520, the lexical mapper 150 maps each of the text-based strings in the collection 220-1 to a set of lexical identifiers 240-1. Each lexical identifier in the set 240-1 is a unique numerical value representing a corresponding text-based string in the collection 220-1. The lexical identifiers can be generated by the lexical mapper 150 and be provided in a lexical map 290. In the lexical map 290, each lexical identifier represents (i.e. is associated with) a term (e.g. character string, token, phrase, word) and/or character that may occur in the collection 220-1.

At step 530, the lexical mapper 150 analyzes the text-based strings in the collection based on processing of the set of lexical identifiers associated with the text-based strings. For example, to produce a term frequency metric (e.g. term frequency, inverse document frequency, etc.), the lexical mapper 150 selects a lexical identifier in the set 240-1 and can count the number of occurrences of the selected lexical identifier in the set 240-1. To achieve this end, the lexical mapper 150 can perform sort and group functions as well other functions to logically organize the lexical identifiers in the set 240-1 to make counting more efficient.

Thus, instead of counting each occurrence of every text-based string in the collection 220-1, term frequency metrics derived based on a selected lexical identifier in the set 240-1 will indicates the occurrences of every text-based string in the collection of text-based strings 220-1. The lexical mapper 150 thereby provides a more efficient approach to text mining because each lexical identifier in the set 240-1 is ultimately a smaller, compressed representation of its corresponding text-based string from the collection 220-1.

The above process can be repeated for each of multiple documents 200.

Figure 6:
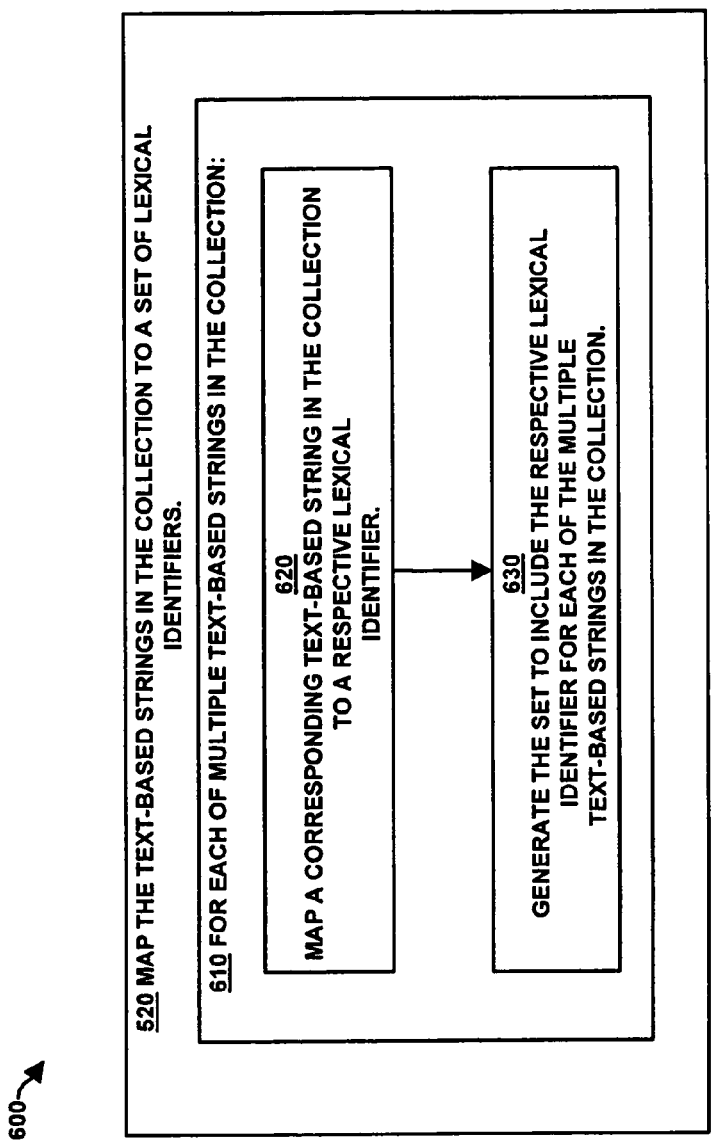
FIG. 6 is an example flowchart of processing steps performed by a lexical mapper function to map text-based strings to a set of lexical identifiers according to embodiments herein.

FIG. 6 is an example flowchart of processing steps performed by a lexical mapper 150 to map text-based strings to a set of lexical identifiers according to embodiments herein. It is understood that, due the size (e.g. <=2 bytes) of the lexical identifiers in the lexical map 290, mapping the text-based strings in the collection 220-1 to the set 240-1 of lexical identifiers (see step 520) results in a substantial reduction in the capacity of storage required to store a representation of the collection 220-1 of text-based strings. In other words, the mapping function 230 as discussed above performs a compression technique of converting the text-based string found in the documents 200 to corresponding lexical identifier values, which are typically smaller in size than the original string.

At step 610, for each of the multiple text-based strings in the collection 220-1, the lexical mapper 150 maps a corresponding text-based string in the collection to a respective lexical identifier at step 620. For example, as illustrated in FIG. 2, the lexical mapper retrieves "string F" in the collection 220-1 of text-based strings. In the lexical map 290, a lexical identifier (05) has been generated and assigned to a term of "string F". Thus, the mapping function 230 maps "string F" in the collection 220-1 to the corresponding lexical identifier of 05. In another example, the lexical mapper retrieves "string K" in the collection 220-1 of text-based strings. In the lexical map 290, a lexical identifier (0A) has been generated and assigned to a term of "string K". Thus, the mapping function 230 maps "string K" in the collection 220-1 to the corresponding lexical identifier of 0A. This process is repeated for each text-based string in the document being converted.

At step 630, the lexical mapper 150 generates the set to include the respective lexical identifier for each of the multiple text-based strings in the collection. Continuing with the examples from FIG. 2 with regard to "string F" and "string K", the lexical mapper 150 includes the corresponding lexical identifiers (0E, 0A) in the set 240-1 of lexical identifiers to numerically represent "string F" and "string K" from the collection 220-1 of text based strings.

Figure 7:
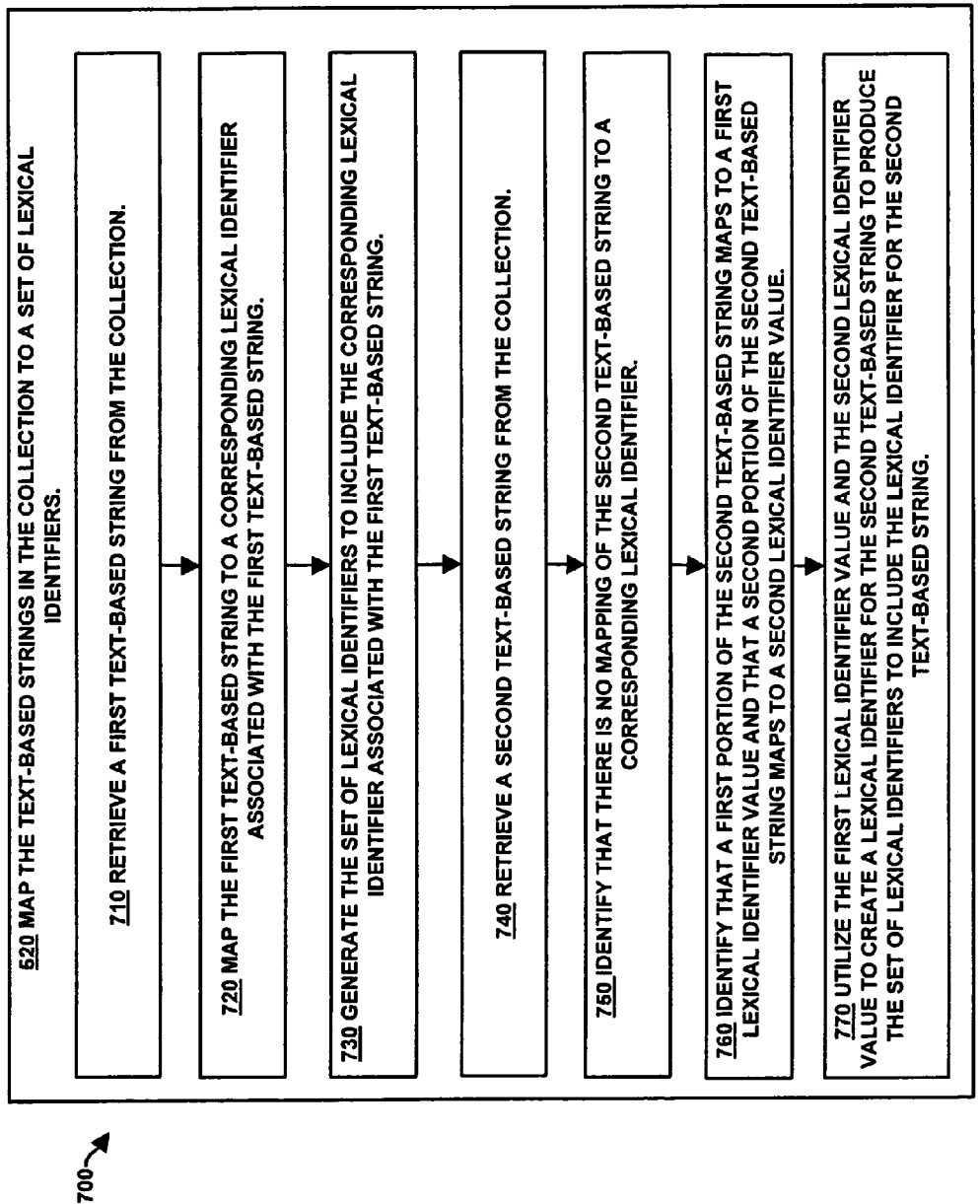
FIG. 7 is an example flowchart of processing steps performed by a lexical mapper function to map text-based strings to a set of lexical identifiers according to embodiments herein.

FIG. 7 is an example flowchart of processing steps performed by a lexical mapper 150 to map text based strings to a set of lexical identifiers according to embodiments herein.

At step 710, the lexical mapper 150 retrieves a first text-based string from a collection of text-based string.

At step 720, the lexical mapper 150 maps the first text-based string to a corresponding lexical identifier associated with the first text-based string.

At step 730, the lexical mapper 150 generates the set of lexical identifiers to include the corresponding lexical identifier associated with the first text-based string.

For example, as illustrated in FIG. 2, the lexical mapper can retrieve "string A" in the collection 220-1 of text-based strings. In the lexical map 290, a lexical identifier (00) has been generated and assigned to a term of "string A". The mapping function 230 maps "string A" in the collection 220-1 to the corresponding lexical identifier of 00. The lexical mapper 150 then includes the corresponding lexical identifier of 00 in the set 240-1 of lexical identifiers.

At step 740, the lexical mapper 150 retrieves a second text-based string from the collection.

At step 750, the lexical mapper 150 identifies that there is no mapping of the second text-based string to a corresponding lexical identifier.

At step 760, the lexical mapper 150 identifies that a first portion of the second text-based string maps to a first lexical identifier value and that a second portion of the second text-based string maps to a second lexical identifier value.

At step 770, the lexical mapper 150 utilizes the first lexical identifier value and the second lexical identifier value to create a lexical identifier for the second text-based string to produce the set of lexical identifiers to include the lexical identifier for the second text-based string. In one embodiment, to produce the lexical identifier for the second text-based string, the lexical mapper 150 concatenates the first lexical identifier value with the second lexical identifier value.

For example, where the mapping function 230 of the lexical mapper 150 determines that no lexical identifier in the lexical map 290 matches to a particular text-based string in the collection 220-1, the lexical mapper 150 matches portions of the text-based string to corresponding lexical identifier values in the map 290. The mapping function then produces a lexical identifier for the particular text-based string by combining or concatenating the lexical identifiers for the portions of the particular text-based string.

In addition, if the resulting lexical identifier for the particular text-based string produces a lexical identifier with a large byte size, the lexical mapper 150 may identify an overflow condition in which the lexical identifier is larger than a predefined size such as 8 bytes. For example, if the resulting lexical identifier would be too long based on concatenating more than four lexical identifier values together, the lexical mapper can apply a hash algorithm, such as the Fowler-Noll-Vo algorithm) to the set of lexical identifier values to produce an lexical identifier of a more reasonable size (e.g., an 8 byte value) for the particular text-based string.

Figure 8:
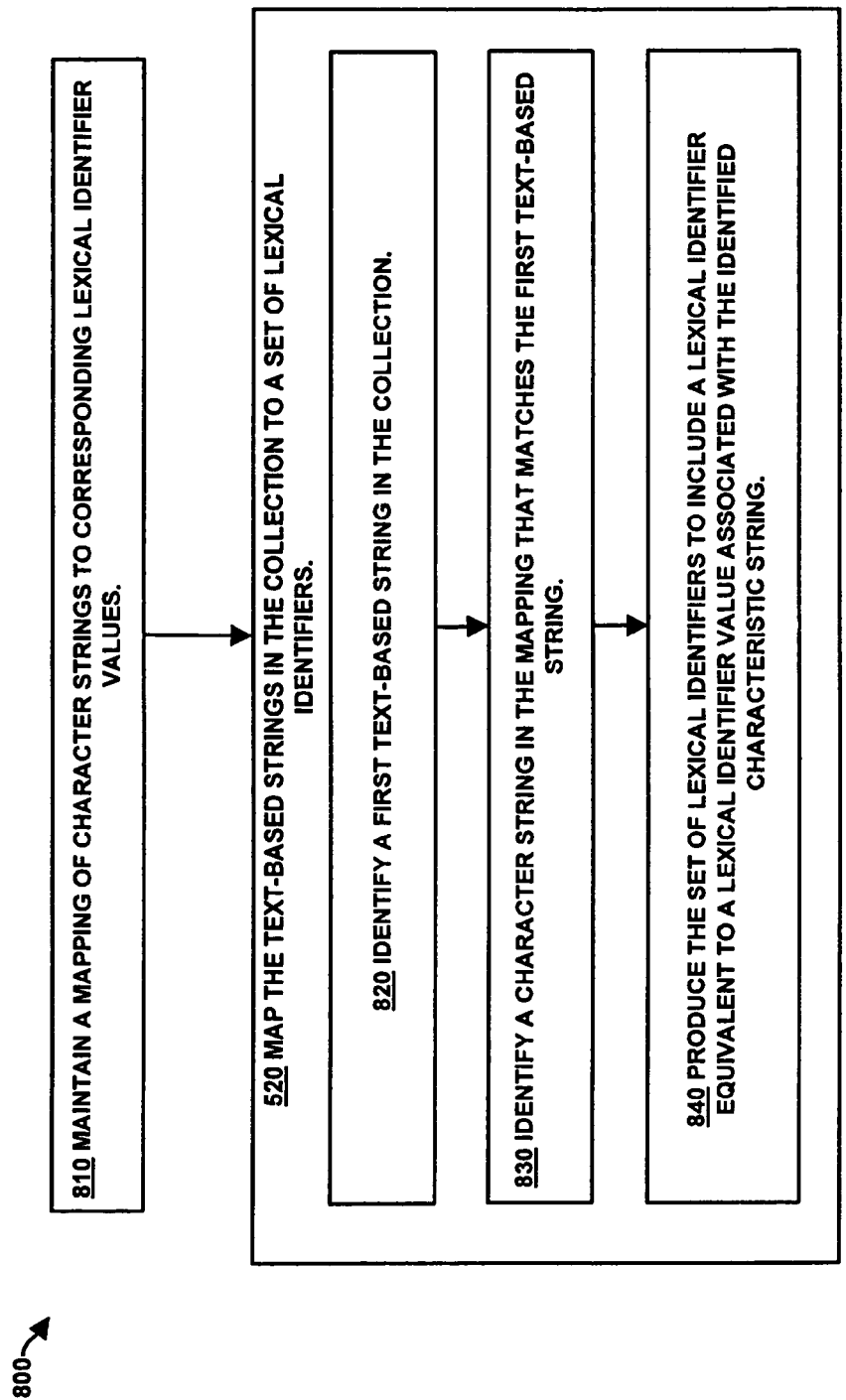
FIG. 8 is an example flowchart of processing steps performed by a lexical mapper to map text-based strings to a set of lexical identifiers according to embodiments herein.

FIG. 8 is a flowchart of processing steps performed by a lexical mapper 150 to map text based strings to a set of lexical identifiers according to embodiments herein.

At step 810, the lexical mapper 150 maintains a mapping, such as the lexical map 290, of character strings to corresponding lexical identifier values. To create the lexical map 290 (i.e. the mapping), the lexical mapper 150 can create (or obtain) a pool of words (e.g. text strings, character strings, tokens, terms) and characters. A list of lexical identifiers, each a unique numerical value, can be generated by a lexical I.D. generator 280. The lexical mapper 150 can assign each unique word from the pool of words to one of the lexical identifiers. The lexical mapper 150 can also assign text characters to one of the lexical identifiers.

At step 820, the lexical mapper 150 identifies a first text-based string in the collection 220-1.

At step 830, the lexical mapper 150 identifies a character string in the mapping (i.e. the lexical 290) that matches the first text-based string.

At step 840, the lexical mapper 150 produces the set of lexical identifiers 240-1 to include a lexical identifier equivalent to a lexical identifier value associated with the identified characteristic string.

Figure 9:
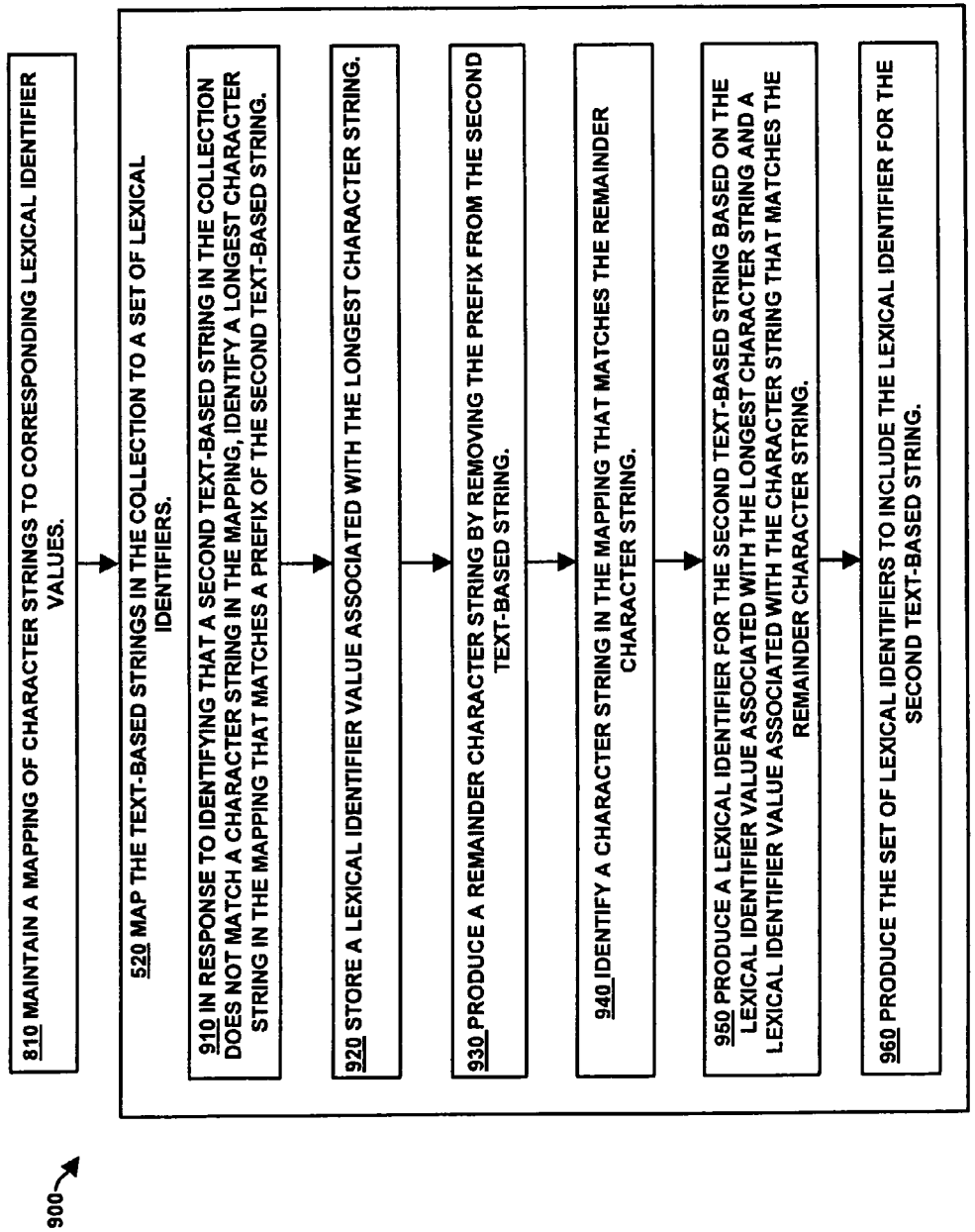
FIG. 9 is an example flowchart of processing steps performed by a lexical mapper to map text-based strings to a set of lexical identifiers according to embodiments herein.

FIG. 9 is a flowchart of processing steps performed by a lexical mapper 150 to map text-based strings to a set of lexical identifiers according to embodiments herein.

At step 910, in response to identifying that a second text-based string in the collection 220-1 does not match a character string in the mapping (i.e. a term in the lexical map 290), the lexical mapper 150 identifies a longest character string in the mapping that matches a prefix (i.e. a sub-string) of the second text-based string. Hence, starting at the beginning of the second text-based string, the lexical mapper 150 searches through combinations of characters within the second text-based string until it finds the longest sequence of characters that can be represented by a single lexical identifier from the lexical map 290.

The lexical mapper 150 is thereby searching for the largest prefix in the second text-based string that can be mapped to a lexical identifier. It is understood that the lexical mapper 150 is not limited to searching for the largest prefix of a text-based string. Instead, for example, the largest suffix can be searched for and mapped by the lexical mapper 150.

At step 920, the lexical mapper 150 stores a lexical identifier value associated with the longest character string (i.e the prefix). At step 930, the lexical mapper 150 produces a remainder character string by removing the prefix from the second text-based string. At step 940, the lexical mapper 150 identifies a character string in the mapping (i.e. a term in the lexical map 290) that matches the remainder character string.

Thus, since the longest character string (i.e. the prefix) of the second text-based string has been matched to a character string in the lexical map 290, there is a corresponding lexical identifier that can represent the longest character string (i.e. the prefix). In addition, the prefix's corresponding lexical identifier can be held in memory storage (e.g. temporary cache) and the lexical mapper 150 can iterate the prefix searching process on the unmatched portion of the second text-based string by removing the prefix that has already mapped to a lexical identifier. Removal of the prefix creates a remainder character string of the second text-based string that can be searched by the lexical mapper 150 to find a prefix in the remainder character string that matches to a character string (i.e. term) in the lexical map 290.

It is understood that the lexical mapper 150 can continue iterating and searching through portions of the remainder character string. As portions of the remainder character string match to a character string (i.e. a term) in the lexical map 290, the corresponding lexical identifier can be identified and stored. Again, the matching portion of the remainder character string is removed to create yet another remainder character string. Where no portions of a remainder character string matches to a character string (i.e. a term) in the lexical map 290, then the lexical mapper 150 can match each character of the remainder character string to a character in the lexical map 290 since characters have corresponding lexical identifiers in the lexical map 290 as well.

At step 950, the lexical mapper 150 produces a lexical identifier for the second text-based string based on the lexical identifier value associated with the longest character string and a lexical identifier value associated with the character string that matches the remainder character string.

At step 960, the lexical mapper 150 produces the set 240-1 of lexical identifiers to include the lexical identifier for the second text-based string.

For example, the lexical mapper 150 can access all the lexical identifiers that have been stored throughout the process of matching the various portions of the second text-based string. Once the lexical mapper 150 has obtained the lexical identifiers, they can be concatenated to produce a lexical identifier that represents the entire second text-based string.

Note again that techniques herein are well suited for a lexical mapper 150 that allows for a lexical mapper 150 that analyzes text-based strings in the collection 220-1 based on processing of the set of 240-1 lexical identifiers associated with the text-based strings. Hence, the lexical mapper 150 provides a more efficient approach to text mining because each lexical identifier is a compressed representation of a text based strings (e.g. character string, character, token, word, phrase, term).

The lexical mapper application 150-1 may be stored on a computer readable medium (such as a floppy disk), hard disk, electronic, magnetic, optical, or other computer readable medium. It is understood that embodiments and techniques discussed herein are well suited for other applications as well.

What is claimed is:

1. A computer-implemented method comprising:
receiving, at a computer device, a collection of text-based strings associated with a document;
determining, via the computer device, a set of lexical identifiers for the collection of text-based strings, the set of lexical identifiers comprising one or more lexical identifiers assigned to uniquely represent one or more of the text-based strings of the collection, wherein the one or more lexical identifiers are assigned using a map, wherein, if wholly represented in the map, a text-based string of the collection is represented by a lexical identifier, and, if not wholly represented in the map, the text-based string of the collection is represented using multiple lexical identifiers from the map, wherein the map comprises lexical identifier values such that any text-based string can be represented using either a single lexical identifier or a new lexical identifier created using multiple lexical values of the map.

2. The method as in claim 1 further comprising:
processing the document; and
based on the processing, producing the collection of text-based strings by: i) filtering punctuation from the document, ii) removing at least one stopword from the document, and iii) generating stem values from phrases in the document, each of the phrases including at least one word.

3. The method as in claim 2, wherein producing the collection of text-based strings includes:
performing codepoint normalization on the document according to a selected language.

4. The method as in claim 1 further comprising processing of the set of lexical identifiers associated with the text-based strings, the processing comprising:
for each of multiple lexical identifiers in the set, repeating steps of:
selecting a lexical identifier found in the set; and
counting a number of occurrences of the selected lexical identifier to identify a number of times a text-based string corresponding to the selected lexical identifier appears in the document.

5. The method as in claim 4 further comprising:
computing term frequencies for the text-based strings in the document based on the processing of the set of lexical identifiers; and
computing an inverse document frequency value based at least in part on processing of sets of lexical identifiers associated with documents other than the document.

6. The method as in claim 1, wherein, if the text-based string of the collection is not wholly represented in the map, determining the set of lexical identifiers further comprises:
identifying that a first portion of the text-based string maps to a first lexical identifier value in the map;
identifying that a second portion of the text-based string maps to a second lexical identifier value in the map; and
utilizing the first lexical identifier value and the second lexical identifier value to create the new lexical identifier for the text-based string, and including the new lexical identifier in the set of lexical identifiers for the collection of text-based strings.

7. The method as in claim 6, wherein utilizing the first lexical identifier value and the second lexical identifier value comprises:
concatenating the first lexical identifier value with the second lexical identifier value to create the new lexical identifier for the text-based string.

8. The method as in claim 6, wherein identifying that the first portion of the text-based string maps to a first lexical identifier value in the map comprises identifying that the first lexical identifier value is associated with a longest character string in the map that matches a prefix of the text-based string.

9. The method as in claim 1, wherein a size of the new lexical identifier is limited to be within a predefined size limit.

10. A computer readable medium comprising executable instructions encoded thereon operable on a computerized device, the computer readable medium comprising:
instructions for receiving a collection of text-based strings associated with a document;
instructions for determining a set of lexical identifiers for the collection of text-based strings, the set of lexical identifiers comprising one or more lexical identifiers assigned to uniquely represent one or more of the text-based strings of the collection, wherein the one or more lexical identifiers are assigned using a map, wherein, if wholly represented in the map, a text-based string of the collection is represented by a lexical identifier, and, if not wholly represented in the map, the text-based string of the collection is represented using multiple lexical identifiers from the map, wherein the map comprises lexical identifier values such that any text-based string can be represented using either a single lexical identifier or a new lexical identifier created using multiple lexical values of the map.

11. The computer readable medium as in claim 10, further comprising:
instructions for processing the document and producing the collection of text-based strings by: i) filtering punctuation from the document, ii) removing at least one stopword from the document, and iii) generating stem values from phrases in the document, each of the phrases including at least one word.

12. The computer readable medium as in claim 10 further comprising instructions for processing of the set of lexical identifiers associated with the text-based strings comprising:

instructions for selecting a lexical identifier found in the set; and instructions for counting a number of occurrences of the selected lexical identifier to identify a number of times a text-based string corresponding to the selected lexical identifier appears in the document.

13. The computer readable medium as in claim 10, wherein the instructions for determining a set of lexical identifiers for the collection of text-based strings further comprise:

instructions for identifying that a first portion of the text-based string maps to a first lexical identifier value in the map;

instructions for identifying that a second portion of the text-based string maps to a second lexical identifier value in the map; and instructions for utilizing the first lexical identifier value and the second lexical identifier value to create the new lexical identifier for the text-based string and including the new lexical identifier in the set of lexical identifiers for the collection of text-based strings.

14. The computer readable medium as in claim 13, wherein the instructions for utilizing the first lexical identifier value and the second lexical identifier value comprise:

instructions for concatenating the first lexical identifier value with the second lexical identifier value to create the new lexical identifier for the text-based string.

15. The computer readable medium as in claim 13, wherein identifying that the first portion of the text-based string maps to a first lexical identifier value in the map comprises identifying that the first lexical identifier value is associated with a longest character string in the map that matches a prefix of the text-based string.

16. A computer system comprising:

a processor;

a memory unit that stores instructions associated with an application executed by the processor; and an interconnect coupling the processor and the memory unit, enabling the computer system to execute the application and perform operations comprising:

receiving, at a computer device, a collection of text-based strings associated with a document;

determining, via the computer device, a set of lexical identifiers for the collection of text-based strings, the set of lexical identifiers comprising one or more lexical identifiers assigned to uniquely represent one or more of the text-based strings of the collection, wherein the one or more lexical identifiers are assigned using a map, wherein, if wholly represented in the map, a text-based string of the collection is represented by a lexical identifier, and, if not wholly represented in the map, the text-based string of the collection is represented using multiple lexical identifiers from the map, wherein the map comprises lexical identifier values such that any text-based string can be represented using either a single lexical identifier or a new lexical identifier created using multiple lexical values of the map.

\* \* \* \* \*